United States Patent
Shen et al.

(10) Patent No.: US 9,869,448 B2
(45) Date of Patent: Jan. 16, 2018

(54) OPTICAL ELEMENT, LIGHTING DEVICE AND LUMINAIRE

(71) Applicant: PHILIPS LIGHTING HOLDING B.V., Eindhoven (NL)

(72) Inventors: Mo Shen, Eindhoven (NL); Yun Li, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/103,395

(22) PCT Filed: Dec. 24, 2014

(86) PCT No.: PCT/EP2014/079325
§ 371 (c)(1),
(2) Date: Jun. 10, 2016

(87) PCT Pub. No.: WO2015/101583
PCT Pub. Date: Jul. 9, 2015

(65) Prior Publication Data
US 2016/0305630 A1    Oct. 20, 2016

(30) Foreign Application Priority Data

Jan. 3, 2014   (WO) ................ PCT/CN2014/070064
Apr. 3, 2014   (EP) ..................................... 14163375

(51) Int. Cl.
*F21V 5/02*   (2006.01)
*G02B 19/00*  (2006.01)
(Continued)

(52) U.S. Cl.
CPC ............... *F21V 5/02* (2013.01); *F21K 9/232* (2016.08); *F21K 9/60* (2016.08); *F21V 3/02* (2013.01);
(Continued)

(58) Field of Classification Search
CPC ... F21V 3/02; F21V 5/02; F21V 13/04; F21V 3/0427; F21V 3/0445; F21V 7/0091;
(Continued)

(56) References Cited

U.S. PATENT DOCUMENTS 2,185,694 A   1/1940  Noe
3,621,234 A * 11/1971  Fremont ................. F21S 6/001
                                              439/542

(Continued)

FOREIGN PATENT DOCUMENTS

GB           995255 A     6/1965
WO    WO2010079439 A1     7/2010
WO    WO2011141616 A1    11/2011

*Primary Examiner* — Peggy Neils

(57) ABSTRACT

Disclosed is an optical element (10) comprising a central cavity (20) extending from a first aperture (12) to a second aperture (14) of the optical element, said central cavity gradually widening in a direction from the first aperture to the second aperture, said central cavity being delimited by a stack of transparent frustums (30) including a first frustum defining the first aperture and a final frustum defining the second aperture, each frustum having a prismatic outer surface (32) having a first surface portion (34) tapering in the direction from the second aperture to the first aperture and a continuous inner surface (36), wherein the respective continuous inner surfaces combine to delimit said central cavity. Also disclosed is a lighting device including such an optical element and a luminaire including such a lighting device.

14 Claims, 5 Drawing Sheets

(51) Int. Cl.
  *F21V 3/02* (2006.01)
  *F21V 7/00* (2006.01)
  *F21K 9/232* (2016.01)
  *F21K 9/60* (2016.01)
  *F21V 13/04* (2006.01)
  *F21V 3/04* (2006.01)
  *F21W 121/00* (2006.01)
  *F21Y 115/10* (2016.01)

(52) U.S. Cl.
  CPC ............ F21V 7/0091 (2013.01); F21V 13/04 (2013.01); G02B 19/0061 (2013.01); G02B 19/0071 (2013.01); *F21V 3/0427* (2013.01); *F21V 3/0445* (2013.01); *F21W 2121/00* (2013.01); *F21Y 2115/10* (2016.08)

(58) Field of Classification Search
  CPC ....... F21K 9/232; F21K 9/60; F21W 2121/00; F21Y 2115/10; G02B 19/0061; F21S 6/001
  See application file for complete search history.

(56) References Cited

U.S. PATENT DOCUMENTS

| | | | |
|---|---|---|---|
| 8,540,401 B2 * | 9/2013 | Simon | F21V 23/009 |
| | | | 313/46 |
| 8,750,671 B1 * | 6/2014 | Kelly | F21V 3/049 |
| | | | 362/335 |
| 9,316,386 B2 * | 4/2016 | Breidenassel | F21V 29/505 |
| 9,322,523 B2 * | 4/2016 | Patton | F21S 10/046 |
| 2009/0021933 A1 | 1/2009 | Mayer et al. | |
| 2011/0260600 A1 | 10/2011 | Ibi et al. | |
| 2013/0128570 A1 | 5/2013 | Jiang et al. | |
| 2015/0098218 A1 * | 4/2015 | Kai | F21K 9/1355 |
| | | | 362/231 |

* cited by examiner (a)  (b)

OPTICAL ELEMENT, LIGHTING DEVICE AND LUMINAIRE

CROSS-REFERENCE TO PRIOR APPLICATIONS

This application is the U.S. National Phase application under 35 U.S.C. §371 of International Application No. PCT/EP2014/079325, filed on Dec. 24, 2014, which claims the benefit of European Patent Application No. 14163375.0, filed on Apr. 3, 2014, and International Patent Application No. PCT/CN2014/070064. These applications are hereby incorporated by reference herein.

FIELD OF THE INVENTION

The present invention relates to an optical element for use in a lighting device such as a light bulb.

The present invention further relates to a lighting device including such an optical element.

The present invention yet further relates to a luminaire including such a lighting device.

BACKGROUND OF THE INVENTION

Solid state lighting (SSL) elements such as LEDs are rapidly gaining popularity as the successor of more energy-inefficient lighting devices such as incandescent lighting devices. However, market penetration of SSL elements is hampered by a number of factors.

First of all, the intrinsically different nature of light generation by such elements means that the appearance of an SSL element-based lighting element can be quite different to the appearance of an equivalent incandescent lighting device. This extends to the luminous distribution generated by such devices; whereas an incandescent lighting device produces a luminous distribution that is largely omnidirectional in nature, SSL element-based lighting elements naturally tend to produce a more directional luminous output.

Secondly, the manufacturing cost of SSL element-based lighting devices is significantly higher than the manufacturing cost of incandescent lighting devices. Although this higher cost is offset by the superior lifetime of the SSL element-based lighting devices, it nevertheless dissuades consumers from purchasing SSL element-based lighting devices as the initial cost may be considered prohibitive.

The above problems pose a fundamental dilemma for the manufacturers of SSL element-based lighting devices, because in order to more closely match the appearance of incandescent counterparts additional optical elements have to be added to the design of the lighting device. However, such additional optical elements can significantly add to the cost of the SSL element-based lighting device. This problem is particularly relevant when the lighting device is a light bulb, especially light bulbs that are expected to have a traditional appearance such as candle-shaped light bulbs An example of such an optical element is disclosed in WO2010/079439 A1. This application discloses an optical element including a light guide into which light from one or more light-emitting diodes in a light unit arranged at one end of the light guide is injected, and a reflector arranged at the other end of the light guide capable of reflecting light incident on the reflector. The one or more light-emitting diodes are arranged in the centre at one end of the light guide.

Although this optical element ensures that the luminous distribution closely mimicking that of an incandescent light bulb is achieved, e.g. it can closely mimic the sparkling effect of an incandescent candle light bulb, a drawback is that the design of the optical element is closely linked to the number of light-emitting diodes in the lighting device where the optical element is to be used. The limited reusability of such optical elements is a contributing factor in the relatively high cost of SSL element-based lighting devices.

SUMMARY OF THE INVENTION

The present invention seeks to provide an optical element approximating an omnidirectional luminous distribution when used in combination with solid state lighting elements and being a reusable.

The present invention further seeks to provide a lighting device including such an optical element.

The present invention yet further seeks to provide a luminaire comprising such a lighting device.

According to an aspect, there is provided an optical element comprising a central cavity extending from a first aperture to a second aperture of the optical element, said central cavity gradually widening in a direction from the first aperture to the second aperture, said central cavity being delimited by a stack of transparent frustums including a first frustum defining the first aperture and a final frustum defining the second aperture, each frustum having a prismatic outer surface having a first surface portion tapering in the direction from the second aperture to the first aperture and a continuous inner surface, wherein the respective continuous inner surfaces combine to delimit said central cavity.

Such an optical element can be used in conjunction with an annular pattern of solid state lighting elements wherein the elements are arranged such that the luminous output is coupled into the optical element adjacent to the first aperture. The combined continuous inner surfaces combine to form a (approximated) curved inner surface that reflects part of the luminous output of the solid state lighting elements whilst allowing another part of the luminous output to travel through the curved inner surface into the cavity of the optical element. This ensures that the light generated by the SSL elements is scattered in a large number of directions, which can be used to create an appearance of omnidirectional luminance and/or a sparkling effect. At the same time, the number of SSL elements in the annular pattern can be easily varied, as this does not affect the performance of the optical element. As such, the optical element provides a high degree of flexibility as it can be used with a wide variety of annular SSL element patterns.

In an embodiment, each prismatic surface has a reflective second surface portion, wherein the first surface portion tapers from the second surface portion in the direction of the first aperture. This further increases the degree of scattering produced by the optical element, thereby further improving the approximation of omnidirectional luminance produced by a lighting device comprising the optical element.

Preferably, each reflective second surface portion is a total internal reflection surface for rays incident under at least a predefined angle to create a large degree of scattering produced by this surface portion.

The respective continuous inner surfaces may combine to form a horn-shaped surface. It has been found that such a surface shape is particularly suitable for the aforementioned purpose of splitting the luminous output of the SSL elements into a portion passing through the optical element into its cavity and another portion scattered by the optical element.

In an embodiment, each transparent frustum has an annular shape.

The continuous inner surfaces of the transparent frustums are curved surfaces or linear surfaces. In case of the frustums having linear surfaces, these services will combine to form an approximated inner surface of the optical element that the limits the cavity.

In an embodiment, the width of the respective transparent frustums as defined by the average distance from its continuous inner surface to its prismatic outer surface decreases in the direction from the first aperture to the second aperture. This means that the thickness of the optical element increases in the direction from the second aperture to the first aperture.

Preferably, the respective continuous inner surfaces combine to form an internal reflection surface such that the luminous output of the SSL elements can be divided into two portions as previously explained.

The stack preferably is an integral stack, i.e. made from a single piece of material such that the frustums are not discrete frustums but are merely portions or sections of the single piece of material.

In an embodiment, the transparent frustums are made of an optical grade polymer. This ensures that the optical element can be made in a cost-effective manner, for instance by well-known moulding processes such as injection moulding. Suitable examples of such an optical grade polymer include polycarbonate (PC), polyethylene terephthalate (PET) and poly methyl methacrylate (PMMA).

According to another aspect, there is provided a lighting device comprising a plurality of solid state lighting elements in a circular pattern and the optical element according to an embodiment of the present invention, wherein the first frustum is placed over the solid state elements such that the solid state lighting elements are arranged to emit light into the first frustum. This provides a lighting device that closely mimics the luminous distribution of an incandescent counterpart and that can be manufactured in a cost-effective manner due to the reusability of the optical element therein.

This is part particularly advantageous when the lighting device is a light bulb such as a candle-shaped light bulb.

According to yet another aspect, there is provided a luminaire comprising the lighting device according to an embodiment of the present invention. Such a luminaire may for instance be the holder of the lighting device, e.g. a holder of a light bulb and/or may be an electrical apparatus into which the lighting device is integrated, such as for instance a cooker hood, a refrigerator and so on.

BRIEF DESCRIPTION OF THE DRAWINGS

Embodiments of the invention are described in more detail and by way of non-limiting examples with reference to the accompanying drawings, wherein FIG. 1 schematically depicts a cross-section of an optical element in accordance with an embodiment of the present invention.

DETAILED DESCRIPTION OF THE EMBODIMENTS

Figure 1:
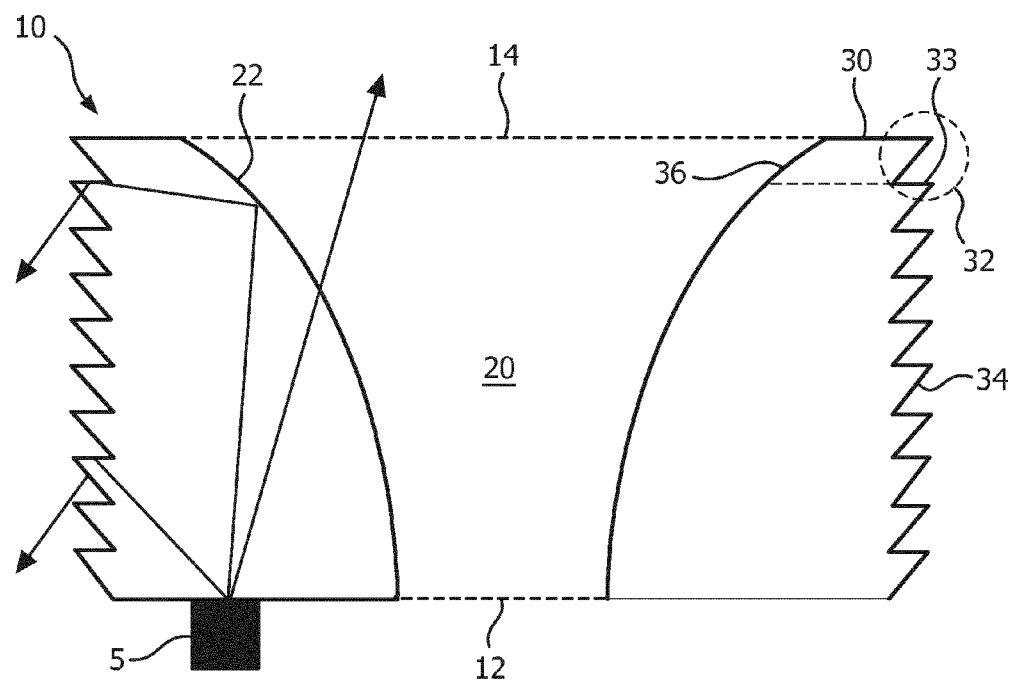

It should be understood that the FIG.s are merely schematic and are not drawn to scale. It should also be understood that the same reference numerals are used throughout the FIG.s to indicate the same or similar parts.

Figure 2:
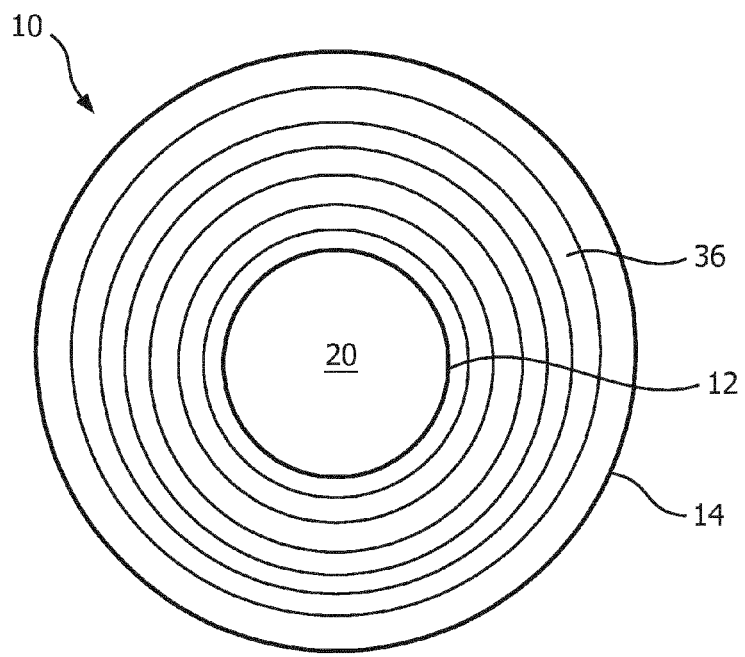
FIG. 2 schematically depicts a top view of the optical element of FIG. 1.

FIG. 1 schematically depicts a cross-section of an optical device 10 in accordance with an embodiment of the present invention, and FIG. 2 schematically depicts a top view of the optical device 10. The optical device 10 has a main body formed by a plurality of frustums 30. Each frustum 30 has an inner surface 36, wherein the inner surfaces 36 of the frustums 30 combine to delimit an inner cavity 20 of the optical element 10. The frustums 30 are shaped such that the cavity 20 tapers from a second aperture 14 towards a first aperture 12. In other words, the cavity 20 gradually widens in the direction from the first aperture 12 to the second aperture 14. The inner surfaces 36 of the frustums 30 may be curved surfaces such that the inner surface 22 of the optical element formed by the combined inner surfaces 36 is a continuous surface, i.e. a surface without angles.

Each frustum 30 has a prismatic outer surface that includes a first surface portion 34 that tapers, i.e. slopes inwardly, in the direction from the second aperture 14 to the first aperture 12. Each prismatic outer surface may further comprise a second surface portion 33 that faces the second aperture 14 such that the first surface portion 34 tapers from the second surface portion 33 towards the first aperture 12. In an embodiment, the first surface portion 34 is a reflective surface portion and preferably is a total internal reflection surface portion.

In an embodiment, the diameter of the cavity 20 of the optical element 10 increases in the direction from the first aperture 12 to the second aperture 14. In other words, the average width of each frustum 30 as defined by the average distance from its continuous inner surface 36 to its prismatic outer surface 32 decreases in the direction from the first aperture 12 to the second aperture 14. In an embodiment, the cavity 20 is horn-shaped wherein the outlet of the horn is the second aperture 14. One of the benefits of such a horn-shaped surface 22 is that it can act both as a refractive and reflective surface depending of the angle of incidence with the surface of light travelling through the body of the optical element 10, as will be explained in more detail below.

The purpose of this particular shape of the optical element 10 is explained with the aid of a solid state lighting element 5 such as a LED (light emitting diode). The optical element 10 is designed such that the luminous surface of a solid state lighting element 5 is positioned facing the surface of the main body of the optical element 10 delimiting the first aperture 12. In operation, the light generated by the solid state lighting element 5 enters the body of the optical element 10 and travels through his body until it reaches the inner surface 22 or the external surface defined by the prismatic surfaces 32.

At the internal surface 22, some of the light generated by the solid state lighting element 5 is refracted at the boundary between the body of the optical element 10 and its cavity 20 as defined by the inner surface 22, whereas some other light generated by the solid state element 5 is reflected by the inner surface 22 towards the prismatic surfaces 32. It will be clear to the skilled person in the art that the portion of light that is reflected by the inner surface 22 can be predetermined by the choice of material for the body of the optical element 10, more relevantly the refractive index of this material, and the degree of curvature of the inner surface 22. For instance, the refractive index of the body material of the optical element 10 can be controlled by the selection of an appropriate material for his body, e.g. an appropriate polymer. Suitable optical grade polymers include but are not limited to polycarbonate, PMMA and PET.

The portion of light that is refracted at the inner surface 22 progresses into the cavity 20 and will exit the optical element 10 through the second aperture 14. The portion of light that is reflected by the inner surface 22 progresses to the prismatic surfaces 32, where this light exits the optical element 10. In an embodiment, this light exits the prismatic surfaces 32 in a refractive manner. In an alternative embodiment, the second surface portions 33 of the prismatic surfaces 32 are reflective surfaces, preferably total internal reflecting surfaces, such that light incident on these surfaces is reflected towards the adjoining first surface portion 34 of the prismatic surface 32, where it leaves the optical element 10 refractively. In this embodiment, the reflective nature of the second surface portions 33 produces a sparkling effect in the luminous output produced by the optical element 10.

As will be apparent to the person skilled in the art, the prismatic surfaces 32 may be shaped in accordance with the requirements of the application domain in which the optical element 10 is to be used, e.g. the angle between the first surface portion 34 and the second surface portion 33 may be chosen in accordance with these requirements.

Figure 3:
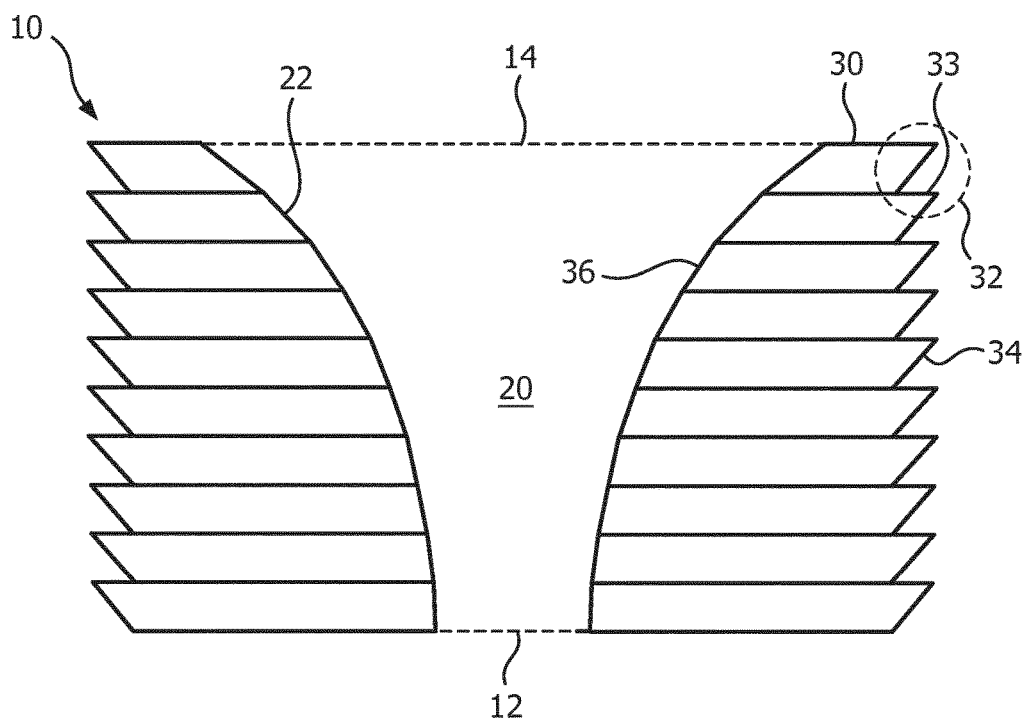
FIG. 3 schematically depicts a cross-section of an optical element in accordance with another embodiment of the present invention.

In the embodiment shown in FIG. 1, the inner surface 22 is a smooth surface. It should be understood that this is by way of non-limiting example only. An alternative embodiment is shown in FIG. 3, in which the inner surface 22 is a multi-faceted surface approximating a continuous surface. In this embodiment, each frustum 30 has an inner surface portion 36 that is linear, such that each frustum 30 defines one of the facets of the inner surface 22. The other features of the optical element 10 may be the same as already described with the aid of FIG. 1, such that these features will not be described again for the sake of brevity only.

Figure 4:
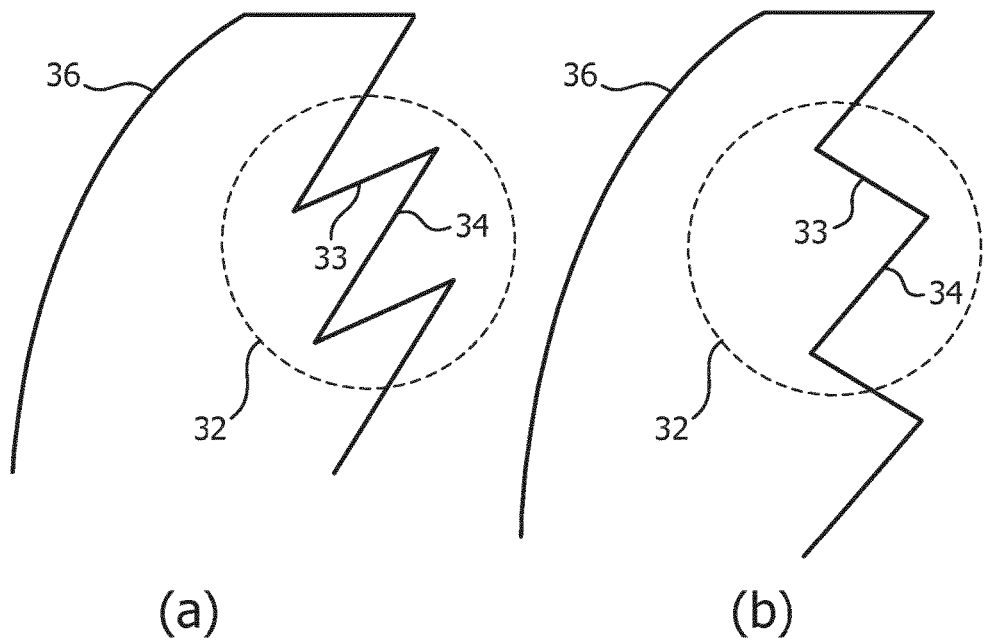
FIG. 4 schematically depicts several aspects of an optical element in accordance with other embodiments of the present invention.

In FIGS. 1 and 3, the prismatic surfaces 32 are cut planarly, i.e. the second surface portion 33 lies in a horizontal plane, by way of non-limiting example only. It is for instance equally feasible to provide an optical element 10 having at least some prismatic surfaces 32 in which the angle between the first surface portion 34 and the second surface portion 33 is upper-cut, as is shown in panel (a) of FIG. 4, or in which the angle between the first surface portion 34 and the second surface portion 33 is under-cut, as is shown in panel (b) of FIG. 4. It should be understood that an optical device 10 according to an embodiment of the present invention may comprise prismatic surfaces 32 that are all cut in the same manner, e.g. planar-cut, under-cut or upper-cut, or may instead comprise any combination of such differently cut prismatic surfaces 32.

Figure 5:
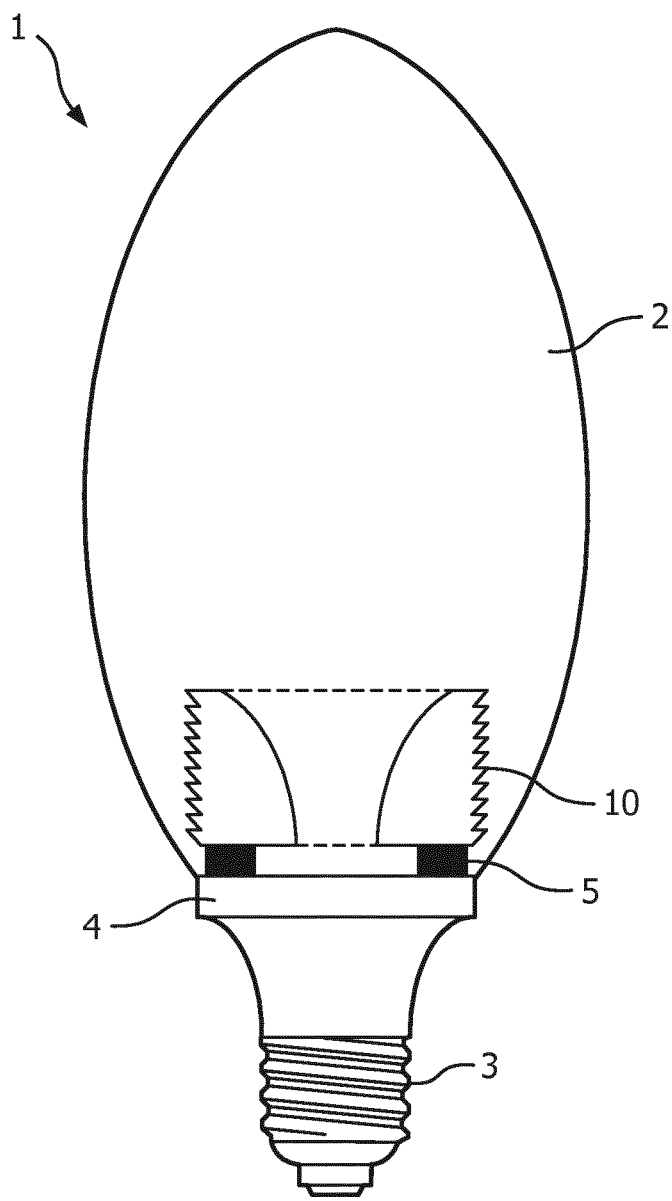
FIG. 5 schematically depicts a lighting device in accordance with an embodiment of the present invention.

FIG. 5 schematically depicts a cross-section of a lighting device 1 according to an embodiment of the present invention. The lighting device 1 comprises a transparent or translucent bulbous member 2 which may have any suitable shape. For instance, in an embodiment, the bulbous member 2 is candle-shaped. The bulbous member 2 may be made of any suitable material such as an optical grade polymer or glass. In an embodiment, the bulbous member 2 may act as a diffuser. The lighting device 1 further comprises a carrier 4 carrying a plurality of solid state lighting elements 5 such as light emitting diodes, which may be organic or inorganic semiconducting light emitting diodes.

Figure 6:
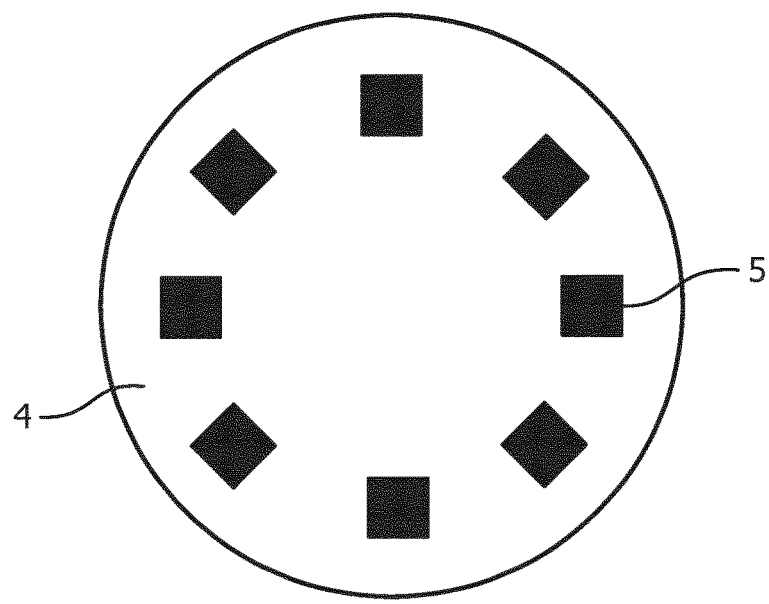
FIG. 6 schematically depicts an aspect of the lighting device of FIG. 5.

The solid state lighting elements 5 are typically arranged in an annular pattern, which is shown in more detail in FIG. 6. Any suitable number of solid state lighting elements 5 may be included in this annular pattern. It is noted that in the context of the present application the term annular pattern refers to an off center positioning of the solid state lighting elements 5 on the carrier 4 wherein each solid state lighting element 5 is spaced from the center by approximately the same distance. The plurality of solid state lighting elements 5 may contain as few as two solid state lighting elements 5, although it will be understood from the foregoing that the number of solid-state lighting elements 5 in the lighting device 1 can be easily varied without having to redesign optical parts of the lighting device.

The lighting device 1 further comprises an embodiment of the optical element 10, which is placed over the solid state lighting elements 5 such that the respective luminous surfaces of the solid state lighting elements 5 face the body surface of the optical element 10 that delimits the first aperture 12, as previously explained in more detail with the aid of FIG. 1. As will be apparent to the skilled person, the radius of the annular pattern of solid state lighting elements 5 is typically is chosen such that the luminous surfaces of these solid state lighting elements align with the body of the optical element 10.

As long as this radius is kept constant, the number of solid state lighting elements 5 can be varied without requiring a redesign of the optical element 10, as the optical manipulation of the light generated by these solid state lighting elements 5 is merely dependent of the position of these solid state lighting elements relative to the body of the optical element 10. This for instance means that the optical element 10 allows for the manufacture of lighting devices 1 with different powers. In particular, a lighting device 1 having high power can be provided as a relatively large number of solid state lighting elements 5 can be integrated in the design of the lighting device 1, as it is merely requires an increase of the density of solid state lighting elements 5 in the annular pattern.

The lighting device 1 further comprises a fitting or end cap 3, which may have any suitable shape, e.g. a screw fitting or bayonet fitting. A screw fitting is shown in FIG. 5.

Figure 7:
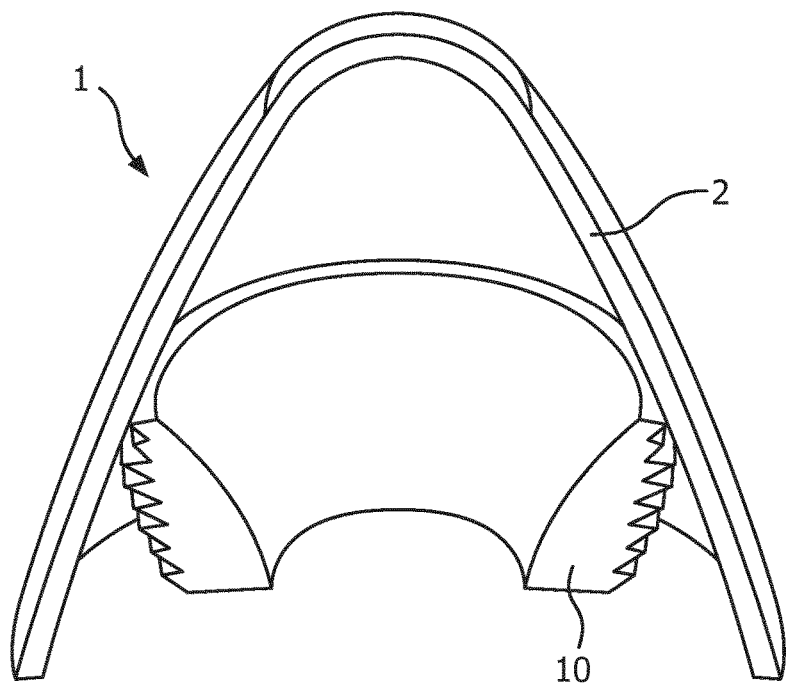
FIG. 7 schematically depicts a perspective view of an aspect of the lighting device of FIG. 5.

FIG. 7 schematically depicts an image of an embodiment of a lighting device 1. A cross-section of the lighting device 1 is shown in perspective view, in which the optical element 10 inside the bulbous member 2 can be readily recognized. In this embodiment, the optical element 10 as a horn-shaped inner surface for the purpose previously explained in more detail with the aid of FIG. 1.

Figure 8:
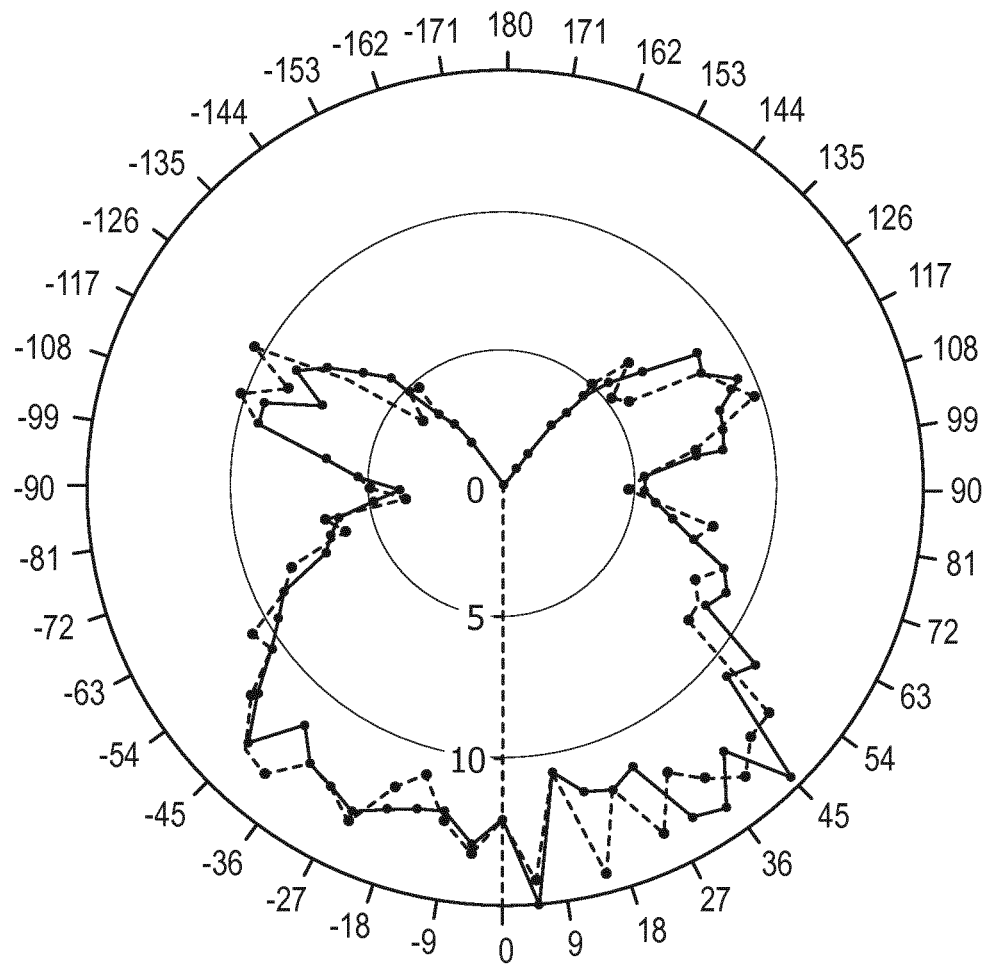
FIG. 8 depicts a luminous distribution plot of a lighting device in accordance with an embodiment of the present invention.

An example light distribution that is achievable with a lighting device 1 according to an embodiment of the present invention is shown in FIG. 8. As can be seen in this light distribution plot, the presence of the optical element 10 ensures that about 35% of all light generated is reflected in a downward direction, i.e. in a direction towards the plane coinciding with the first aperture 12. It further has been found that a lighting device 1 including an embodiment of the optical element 10 can achieve the optical efficiency of about 90%. This demonstrates that a lighting device 1 including an embodiment of the optical element 10 is highly efficient and capable of generating a luminous output distribution that mimics the luminous output distribution of an incandescent lighting device such as an incandescent light bulb.

In an embodiment, the lighting device 1 is a light bulb. The light bulb may be any suitable shape or size, such as a candle bulb or an ES bulb by way of non-limiting example.

The lighting device 1 may be integrated into a luminaire. Such a luminaire may for instance the holder of the lighting device, e.g. a holder of a light bulb and/or may be an electrical apparatus into which the lighting device is integrated, such as for instance a cooker hood, a refrigerator and so on. Other suitable embodiments of such a luminaire will be apparent to the skilled person.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device comprising:
a plurality of solid state lighting elements in a circular pattern; and
an optical element comprising a central cavity extending from a first aperture to a second aperture of the optical element, said central cavity gradually widening in a direction from the first aperture to the second aperture, said central cavity being delimited by a stack of transparent frustums including a first frustum defining the first aperture and a final frustum defining the second aperture, each frustum having a prismatic outer surface having a first surface portion tapering in the direction from the second aperture to the first aperture and a continuous inner surface, wherein the respective continuous inner surfaces combine to delimit said central cavity;
wherein the first frustum is placed over the solid state elements such that the solid state lighting elements are arranged to emit light into the first frustum; and
wherein the width of the respective transparent frustums as defined by the average distance from its continuous inner surface to its prismatic outer surface decreases in the direction from the first aperture to the second aperture.

2. The lighting device of claim 1, wherein each prismatic surface of the optical element has a reflective second surface portion, wherein the first surface portion tapers from the second surface portion in the direction of the first aperture.

3. The lighting device of claim 2, wherein each reflective second surface portion is a total internal reflection surface for rays incident under at least a predefined angle.

4. The lighting device of claim 1, wherein respective continuous inner surfaces combine to form a horn-shaped surface.

5. The lighting device of any of claim 1, wherein each transparent frustum has an annular shape.

6. The lighting device of claim 1, wherein the continuous inner surfaces are curved surfaces or linear surfaces.

7. The lighting device of claim 1, wherein the respective continuous inner surfaces (36) combine to form an internal reflection surface.

8. The lighting device of claim 1, wherein the stack is an integral stack.

9. The lighting device of claim 1, wherein the transparent frustums are made of an optical grade polymer.

10. The lighting device of claim 9, wherein the optical grade polymer is selected from polycarbonate, polyethylene terephthalate and poly methyl methacrylate.

11. The lighting device of claim 10, wherein the lighting device is a light bulb.

12. The lighting device of claim 11, wherein the light bulb is a candle-shaped light bulb.

13. A luminaire comprising the lighting device of claim 12.

14. An optical element comprising a central cavity extending from a first aperture to a second aperture of the optical element, said central cavity gradually widening in a direction from the first aperture to the second aperture, said central cavity being delimited by a stack of transparent frustums including a first frustum defining the first aperture and a final frustum defining the second aperture, each frustum having a prismatic outer surface having a first surface portion tapering in the direction from the second aperture to the first aperture and a continuous inner surface,
wherein the respective continuous inner surfaces combine to delimit said central cavity, wherein each prismatic surface has a reflective second surface portion,
wherein the first surface portion tapers from the second surface portion in the direction of the first aperture, and
wherein the width of the respective transparent frustums as defined by the average distance from its continuous inner surface to its prismatic outer surface decreases in the direction from the first aperture to the second aperture.

* * * * *